March 11, 1930.  E. H. FOLEY  1,750,172
SOUND RECORDING APPARATUS FOR USE IN
EDUCATIONAL MOTION PICTURE PROGRAMS
Filed June 12, 1925   4 Sheets-Sheet 1

Inventor
EARL H. FOLEY,
By *[signature]*
Attorney

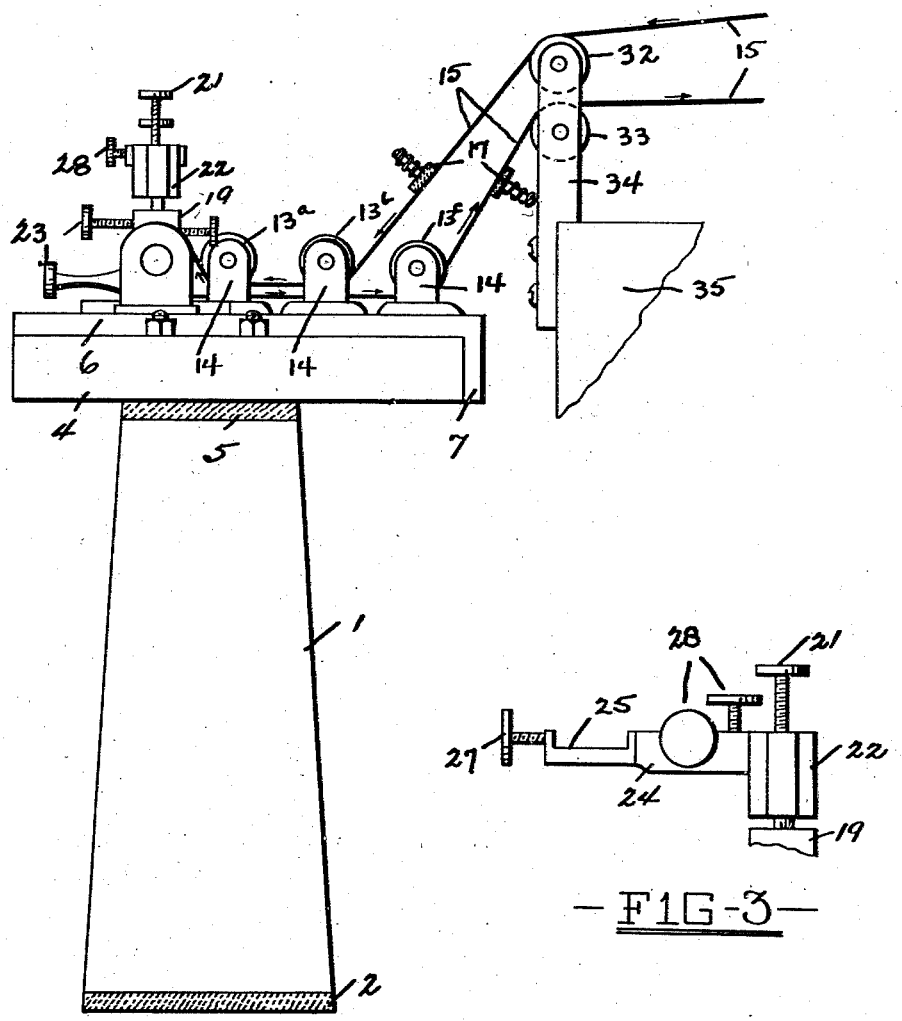

March 11, 1930.  E. H. FOLEY  1,750,172
SOUND RECORDING APPARATUS FOR USE IN
EDUCATIONAL MOTION PICTURE PROGRAMS
Filed June 12, 1925  4 Sheets-Sheet 3
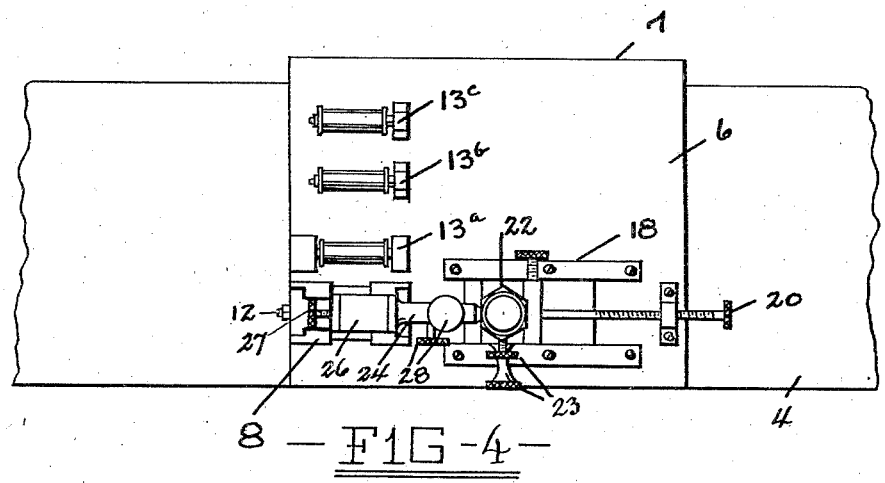
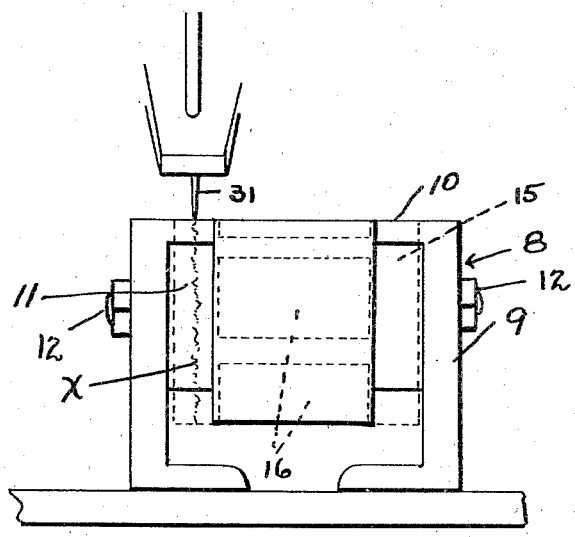
Inventor
EARL H. FOLEY,
Attorney

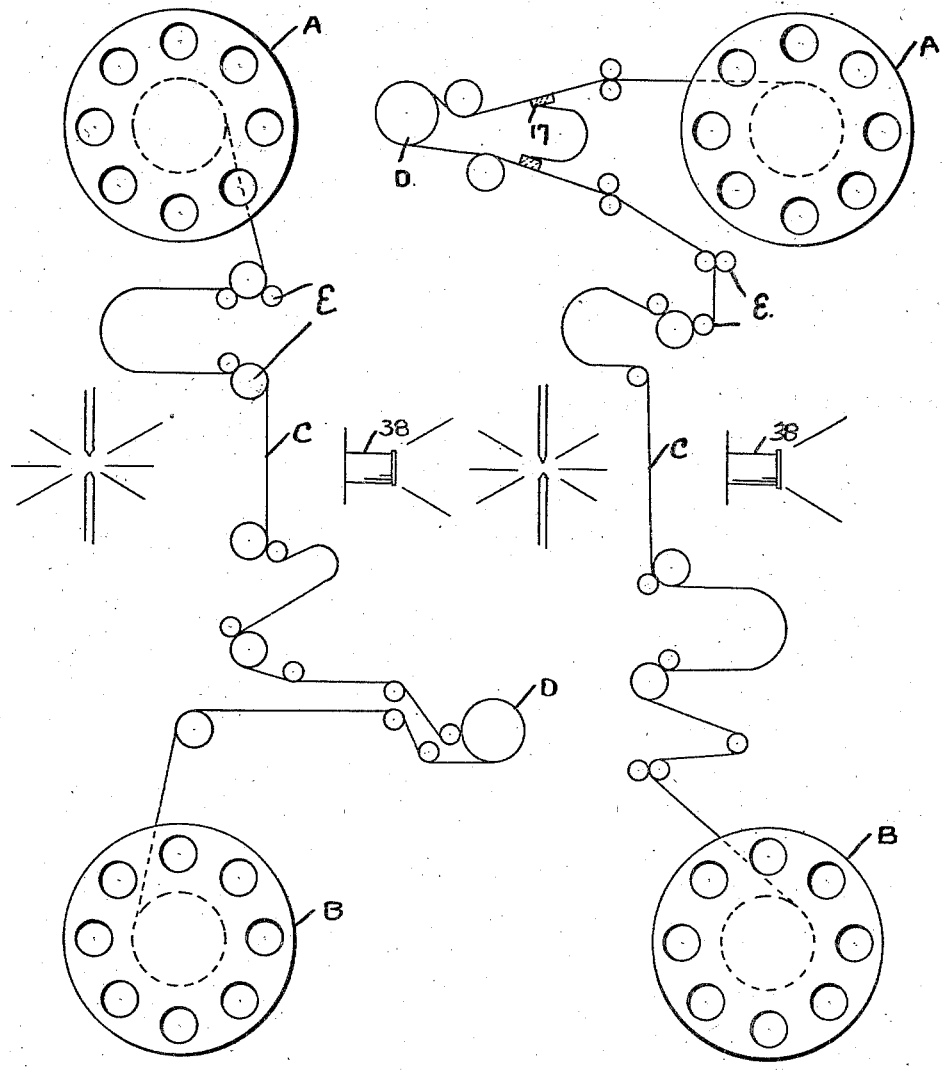

Patented Mar. 11, 1930

1,750,172

UNITED STATES PATENT OFFICE

EARL H. FOLEY, OF SEATTLE, WASHINGTON, ASSIGNOR, BY MESNE ASSIGNMENTS, OF NINETY-NINE ONE-HUNDREDTHS TO INTERNATIONAL ACOUSTIGRAPH COMPANY, A CORPORATION OF WASHINGTON

SOUND-RECORDING APPARATUS FOR USE IN EDUCATIONAL MOTION-PICTURE PROGRAMS

Application filed June 12, 1925. Serial No. 36,636.

My present invention has reference, in its broad aspect, to improvements in apparatus for producing upon (or reproducing from) a motion picture film a sound record for use in conjunction with educational programs, with respect to which it is my purpose to produce by means of my apparatus a faithful reproduction of, for instance, a lecture or the like, the character of reproduction being exceptionally accurate and clear; more particularly, and to the end that such accurate and clear reproduction may be attained, I have provided unique recording means wherein provision is made for insulating my sound sensitive devices from all outside influences such as vibration and the like, and means devised for attaining the proper harmony between the recordation and subsequent reproduction of a sound record and the scene accompanying the same, and that upon a single unitary record body—such record body being the motion picture film.

Heretofore in devices of this character it has been found impossible to produce the proper harmony between the scenes portrayed by a motion picture and a lecture, or other sounds, accompanying the same. This has been largely due to faulty processes of recording and reproduction and the utilization of separate and independent record bodies; one carrying the pictures and the other a sound record—it being practically impossible to synchronize the process of reproduction from relatively independent record bodies without the utilization of apparatus of a delicacy and complexity wholly impractical for general use. Furthermore, in the absence of proper insulating devices the sensitive mechanisms used to properly record sound are influenced by local vibratory disturbances to the end that a record so produced is replete with "strays" and lacks the fine qualities necessary for successful commercial and other practical purposes.

My invention, on the other hand, absolutely eliminates the above disadvantages by affecting simultaneous and synchronous recordation (and reproduction) of a sound record with the projection of the various successive scenes of a given motion picture; such sound record being engraved on the motion picture film, wherein that portion of the film lying between the picture fields and the edge of the film is utilized to receive the sound record. My invention also provides for the effective insulation of all sensitive elements so that local vibratory disturbances have no effect upon the process of recording or subsequent reproduction. I have also provided a unique recording arc, the purpose of which is to afford a fixed base beneath that portion of the record body directly beneath a cutting stylus, and a rolling or non-frictional support beneath the remaining portion of the record body—in this case beneath the fields of the picture film—so that scratching and abrasion is prevented.

Other and equally important objects of my invention may be briefly defined as follows: First, I provide unique adjusting means for my recording head or magnetic recording device support; second, I provide an insulated support for my sensitive sound recording assembly so that the effects of local vibratory disturbances are minimized; third, the unique take up apparatus and feed mechanism of my invention is especially designed to effectively prevent variations in movement such as would be occasioned by slack or improperly arranged feed mechanism, and; fourth, I have adapted my apparatus to the above and other ends without unduly complicating the mechanical parts of the same or increasing their number beyond the dictates of practical expediency.

The structural elements employed to accomplish the above and other results and objects will be hereinafter more fully described in detail and pointed out in the claims appended hereunto and forming a part of this specification, but the scope of my invention may only be determined by the limits defined in the claims.

In the accompanying drawings, wherein is illustrated the preferred embodiment of my invention;—

Figure 2 is a side view of my sound recording apparatus,

Figure 3 is a detail view of my adjustable magnetic recording device support,

Figure 4 is a top plan view of my sound recording apparatus,

Figure 1:
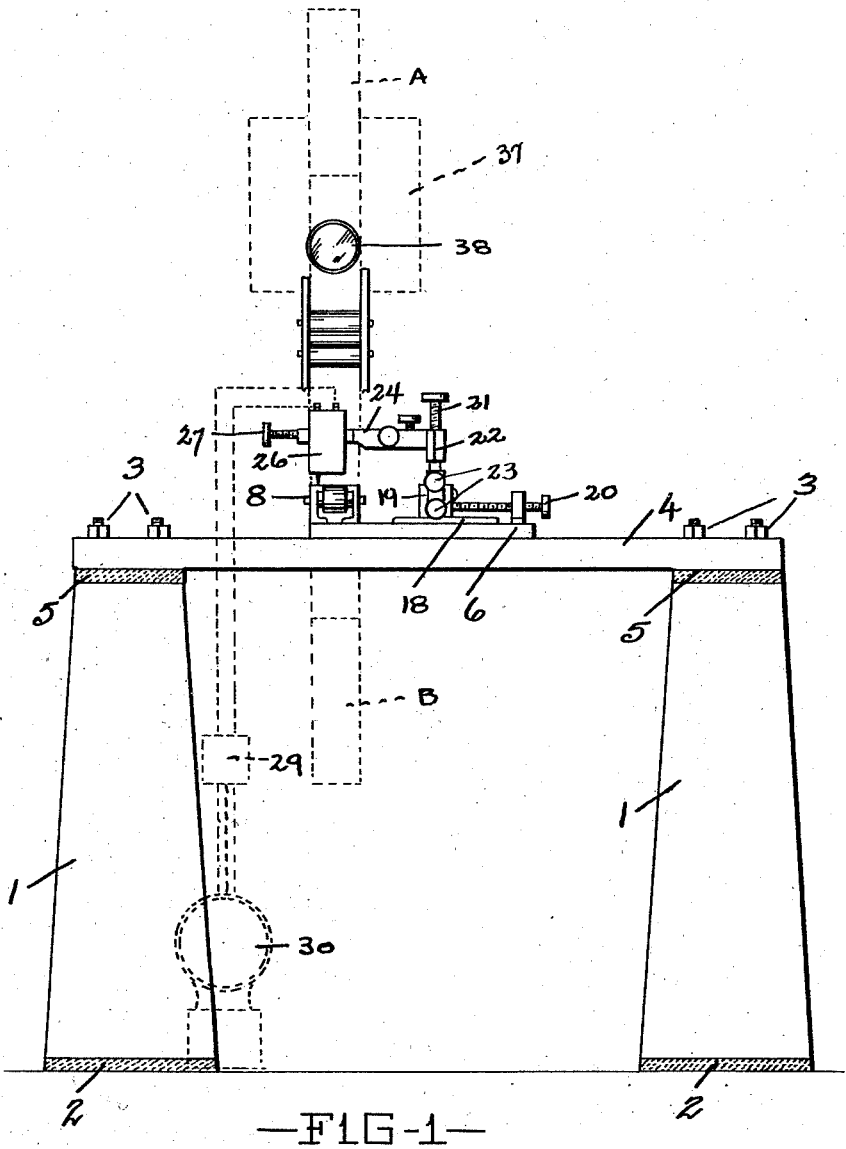
Figure 1 is a front elevation of my apparatus, the motion picture projection mechanism (except the lens) being shown conventionally by dotted lines.

Figure 5 is a detail view of my unique recording arc and the stylus of my magnetic sound recording device, Figure 6 is a diagrammatic view of one method of running a record film through my apparatus; that method being exemplified by recordation below the point of motion picture projection, and Figure 7 is a diagrammatic view of another method of running a record film through my apparatus; that method being exemplified by recordation above the point of motion picture projection.

In the drawings wherein like characters of reference designate like or similar parts throughout the several views;—

The numeral (1) designates the legs on my insulating stand, the same being formed of a relatively inert heavy material such as cement or the like, and having a relatively great mass. The legs (1) are insulated from a base by suitable vibration dampening material (2). Mounted by means of bolts (3) on the legs is a relatively massive top (4), the top being also insulated from the legs by vibration dampening material (5). Manifestly my stand, as constructed, will be relatively unaffected by local vibratory disturbances. Mounted centrally of the top (4) is a plate (6) which is formed with a flange (7) extending along one edge of the top. Carried on the plate (6) is my recording arc (8) which is formed with legs (9), on which are extensions (10) forming fixed anvils, and a roller (11) mounted on bolts (12) and arranged flush with the anvils after the manner described in my co-pending application Serial Number 21,377, filed April 7th 1925. Also mounted on plate (6) and in alignment rearwardly of the arc (8) are a plurality (preferably three in number) of spaced slack take-up rollers (13ª), (13ᵇ) and (13ᶜ) which are non-frictionally journalled in supports (14). In operation a motion picture film (15) is fed beneath rollers (13ª) and (13ᵇ) over the recording arc (8), with the body of the film carrying the fields (16) riding upon the roller (11) thereof, and then down and under roller (13ᶜ).

A pair of spring retained pads (17) engage the film (15) as shown in Figure 2 to steady the same as it passes to and from the rollers of my recording apparatus.

Aligned laterally with the recording arc (8) is a frame (18) carrying a block (19) which is adjustable in one direction by a screw (20). Mounted on the block (19) for vertical adjustment by means of screw (21) is a head (22). Other screws (23) are provided for fixing the block and head when adjustment has been completed. The head (22) has extending therefrom laterally an arm (24) which overhangs the arc (8) and such arm is provided with a cut-away portion (25) for receiving my magnetic recording device (26). The magnetic recording device (26) is of the type described in my co-pending application Serial Number 732,225, August 15th 1924, and is held in place on the arm (24) by screw (27) which engages the base thereof.

In order to retain the arm on the head, screws (28) are provided and these also serve as auxiliary adjusting means. My magnetic recording device (26) is designed to be connected in circuit with a conventional amplifying unit shown in dotted lines at (29), which same is in turn connected in circuit with a microphone (30). In reproducing from my apparatus a diaphragm and stylus assembly is substituted by the magnetic recording device, and a loud speaker for my microphone. My magnetic recording device (26) is formed with a stylus (31) which engages a film (15) at its point of contact with one of the anvils (10) of the recording arc (8)—see Figure 5—so that a record X is engraved adjacent to the picture fields (16) of the film.

As has heretofore been suggested, the film is fed to and from the rollers (13ª), (13ᵇ) and (13ᶜ) between pads (17). The remaining length of the film is fed to my recording apparatus over roller (32) in the direction of the arrow, and from my recording apparatus over roller (33) in the direction of the arrow. Both rollers (32) and (33) are mounted or journalled in standards (34) carried upon a support (35) upon which is also mounted a motion picture projection machine shown in dotted lines at (37) in Figure 1, and having the usual lens (38). The motion picture projection machine includes as a part of its assembly a storage drum A, and a re-wind drum B also indicated by dotted lines.

Manifestly a sound record may be made (or reproduced) either before or after projection of the film, and to this end reference is now made to Figures 6 and 7. In Figures 6 and 7, which are diagrammatic, the films (15) are fed from the storage drums A to the re-wind drums B, the point of projection of each of the films being at C, and the respective points of recording sound at D. The film is projected below the point of recording in Figure 6, and above the point of recording in Figure 7. Suitable non-friction take-up rollers, of the type hereinbefore described are illustrated conventionally at E.

In operation, a motion picture of any educational value, such as a travelogue or the like, is projected in the usual manner from the machine (37) through lens (38) on a screen (not shown), and as the theme is developed the lecture is given and recorded by means of my hereinbefore described apparatus upon the film. Recordation having been effected, reproduction may take place by substituting for my magnetic recording device (26) a diaphragm assembly, and for the microphone (30) a suitable loud speaker. The film is run in a similar manner for reproduction, and an absolutely accurate and harmonious demonstration is attained wherein a fine quality of sound reproduction is had, and that without the presence of "strays" such as are occasioned by local vibratory disturbances.

While in the foregoing, there has been illustrated and described such combination and arrangement of elements as constitute the preferred embodiment of my invention, it is nevertheless desired to emphasize the fact the interpretation of the invention should only be conclusive when made in the light of the subjoined claims.

Having described my invention and its objects with such attention to detail as will thoroughly acquaint one skilled in the art with its construction and advantages, I claim:—

1. In an apparatus of the type described, the combination of a length of sensitive film, a support for the film, means for moving the film over the support, a device for recording sound records on the film, and a support for said device, said support having a base, a block adjustably mounted on the base for movement toward and away from the film support, a head mounted for vertical adjustment on the block, an arm carried by the head and overhanging the support for the film, said arm provided with a cut-away portion for receiving therein the sound recording device.

2. In an apparatus of the type described, the combination of a length of sensitive film, a support for the film, means for moving the film over the support, a device for recording sound records on the film, and a support for said device, said support having a base, a block adjustably mounted for movement toward and away from the film support, means for fixing the block when the same has been adjusted, a head adjustably mounted on the block, means for fixing the head when adjustment has been completed, a laterally extending arm carried by the head and overhanging the support for the film, said arm provided with a cut-away portion near its free end for receiving therein the sound recording device, and means for detachably retaining the sound recording device in the cut-away portion of the arm.

3. In an apparatus of the type described, the combination of a length of sensitive film, a device for recording sound records on the film, and a support for the film, said support having legs, an extension having a curved top portion formed on each leg and extending laterally from the legs and toward each other to receive thereon the edge portions of the film, and a roller between the extensions and carried by the legs and disposed with its upper surface flush with the surface of the extensions to provide a rolling, non-friction support for the portion of the film between its edges.

4. In an apparatus of the type described, the combination of a length of sensitive film, a device for recording sound records on the film, and a support over which the film is trained, said support having a pair of spaced legs, an extension on each leg constituting a fixed anvil for the edge portions of the film and having an upper curved surface, said extensions formed to provide a space therebetween, a roller carried by the legs and disposed with its upper surface flush with the surface of the anvils to provide a rolling, non-friction support for the portion of the film between its edges.

5. In an apparatus of the type described, the combination of a length of sensitive film, a support for said film, means for moving the film over the support, a platform on which the support is carried and which is provided with a flange along one edge thereof for engaging a base, a device for recording sound records on the film, a support for said device carried by the platform, said support having a base, a block adjustably mounted on the base, a head adjustably mounted on the block, an arm carried by the head and receiving thereon the sound recording device, and said arm overhanging the support for the film.

6. In an apparatus of the type described, the combination of a length of sensitive film, a support for said film, means for moving the film over the support, a platform on which the support is carried and which is provided with a flange along one edge thereof for engaging a base, a plurality of spaced apart guide rollers receiving the film and in line with the support therefor for guiding the film to the support, a device for recording sound records on the film, a support for said device carried by the platform, said support having a base, a block adjustably mounted on the base for movement in a horizontal plane, a head adjustably mounted on the block for movement in a vertical plane, an arm carried by the head and provided with a cut-away portion therein for receiving the sound recording device, and said arm overhanging the support for the film.

7. In an apparatus of the type described, the combination of a length of sensitive film, a device for recording sound records on the film, and a support over which the film is trained, said support having legs, an extension on each leg constituting a fixed anvil for the edge portions of the film, said extensions formed to provide a space therebetween, a movable element carried by the legs and disposed with its upper surface flush with the surface of the anvils to provide a rolling, non-friction support for the portion of the film between its edges.

8. In an apparatus of the type described, the combination of a length of sensitive film, a device for recording sound records on the film, and a support over which the film is trained, said support having a pair of spaced legs, a lateral extension on the top of each leg and said extensions directed toward and opposite each other and constituting a fixed anvil for the edge portions of the film and having an upper curved surface, said extensions having their adjacent ends spaced apart, and a roller carried by the legs and disposed between the extensions with its upper surface flush with the upper surface of the extensions to provide a rolling, non-frictional support for the portion of the film between its edges.

In testimony whereof, I affix my signature hereunto.

EARL H. FOLEY.